United States Patent
Jerzak et al.

(10) Patent No.: US 9,424,150 B2
(45) Date of Patent: Aug. 23, 2016

(54) FAULT TOLERANCE BASED QUERY EXECUTION

(75) Inventors: Zbigniew Jerzak, Dresden (DE); Thomas Heinze, Dresden (DE)

(73) Assignee: SAP SE, Walldorf (DE)

(*) Notice: Subject to any disclaimer, the term of this patent is extended or adjusted under 35 U.S.C. 154(b) by 1087 days.

(21) Appl. No.: 13/311,596

(22) Filed: Dec. 6, 2011

(65) Prior Publication Data

US 2013/0144866 A1 Jun. 6, 2013

(51) Int. Cl.
*G06F 11/20* (2006.01)
*G06F 17/30* (2006.01)

(52) U.S. Cl.
CPC ...... *G06F 11/2035* (2013.01); *G06F 17/30477* (2013.01)

(58) Field of Classification Search
CPC ............ G06F 11/2035; G06F 17/30477
See application file for complete search history.

(56) References Cited

U.S. PATENT DOCUMENTS

| | | | | |
|---|---|---|---|---|
| 7,984,043 B1* | 7/2011 | Waas | | 707/718 |
| 2009/0192981 A1* | 7/2009 | Papaemmanouil | | G06F 17/30516 |
| 2010/0030896 A1* | 2/2010 | Chandramouli | .. | G06F 17/30516 |
| | | | | 709/224 |
| 2012/0066020 A1* | 3/2012 | Moon et al. | | 705/7.28 |
| 2014/0310258 A1* | 10/2014 | Tian | | G06F 17/30445 |
| | | | | 707/718 |

FOREIGN PATENT DOCUMENTS

EP 1376400 A2 * 1/2004 ............ G06F 17/30

OTHER PUBLICATIONS

J. Smith et al., "Fault-Tolerance in Distributed Query Processing", Jul. 25-27, 2005, Database Engineering and Application Symposium, 2005. Ideas 2005. 9th International, pp. 329-338.*
M. Balazinska et al.; Fault-tolerance in the borealis distributed stream processing system; published in ACM Transactions on Database Systems—TODS, vol. 33, No. 1, pp. 44, 2008; (http://dl.acm.org/citation.cfm?id=1331907).
T. D. Chandra et al.; Unreliable failure detectors for reliable distributed systems; published in Journal of the ACM (JACM); vol. 43 Issue 2, Mar. 1996; pp. 225-267 (http://www.cs.huji.ac.il/~rds/p225-chandra.pdf).
R. Guerraoui et al.; Software-based replication for fault tolerance; published in IEEE Computer Society Press Los Alamitos, CA, USA; vol. 30 Issue 4, Apr. 1997; pp. 68-74 (http://dl.acm.org/citation.cfm?id=620684).
Jeong-Hyon Hwang et al.; Fast and Highly-Available Stream Processing over Wide Area Networks; appears in IEEE 24th International Conference on Data Engineering, 2008; 10 pages; (http://dl.acm.org/citation.cfm?id=1547106).

(Continued)

*Primary Examiner* — Jensen Hu

(57) ABSTRACT

Various embodiments of systems and methods for a fault tolerance based query execution are described herein. Queries are received from users, the queries including operators. A multi-query optimization is performed on the operators included in the queries to obtain a query plan. A fault tolerance degree is determined for the operators included in the query plan. Based on the fault tolerance degree of the operators, nodes are assigned to the operators included in the query plan. The assigned nodes execute the operators included in the query plan to execute the queries. In one aspect, the nodes simultaneously execute the operators included in the query plan.

17 Claims, 8 Drawing Sheets

(56) References Cited

OTHER PUBLICATIONS

C. Jin et al.; Predicate indexing for incremental multi-query optimization; Proceedings of the 17th international conference on Foundations of intelligent systems; 2008; pp. 339-350; (http://dl.acm.org/citation.cfm?id=1786519).

Y. Kwon et al; Fault-tolerant stream processing using a distributed, replicated file system; Proceedings of the VLDB Endowment; vol. 1 Issue 1, Aug. 2008; pp. 12 (http://dl.acm.org/citation.cfm?id=1453920).

D. C. Luckham; The Power of Events: An Introduction to Complex Event Processing in Distributed Enterprise Systems; Chapter 5; Events, Timing and Causality; published by Addison-Wesley Longman Publishing Co., Inc., Boston, MA, USA,2002; pp. 25 (http://dl.acm.org/citation.cfm?id=515781/).

D. C. Luckham; The Power of Events: An Introduction to Complex Event Processing in Distributed Enterprise Systems; Chapter 6; Event Patterns, Rules and Constraints; published by Addison-Wesley Longman Publishing Co., Inc., Boston, MA, USA,2002; pp. 14 (http://dl.acm.org/citation.cfm?id=515781/).

D. C. Luckham; The Power of Events: An Introduction to Complex Event Processing in Distributed Enterprise Systems; Chapter 7; Complex Events and Event Hierarchies; published by Addison-Wesley Longman Publishing Co., Inc., Boston, MA, USA,2002; pp. 16 (http://dl.acm.org/citation.cfm?id=515781/).

D. C. Luckham; The Power of Events: An Introduction to Complex Event Processing in Distributed Enterprise Systems; Chapter 10; Event Processing Networks; published by Addison-Wesley Longman Publishing Co., Inc., Boston, MA, USA,2002; pp. 31 (http://dl.acm.org/citation.cfm?id=515781/).

B. Schroeder et al; DRAM Errors in the Wild: A Large-Scale Field Study; Proceedings of the eleventh international joint conference on Measurement and modeling of computer systems, pp. 12, New York, NY, USA, 2009. ACM; 12 pages. (http://dl.acm.org/citation.cfm?id=1555372).

T. Sellis; Multiple-query optimization; Published in Journal ACM Transactions on Database Systems (TODS); vol. 13 Issue 1, Mar. 1988; 30 pages. (http://dl.acm.org/citation.cfm?id=42203).

P. Upadhyaya et al.; A latency and fault-tolerance optimizer for online parallel query plans: appears in Proceedings of the ACM SIGMOD International Conference on Management of Data, pp. 241-252, Athens, Greece, Jun. 2011 (http://dl.acm.org/citation.cfm?id=1989350).

* cited by examiner

FAULT TOLERANCE BASED QUERY EXECUTION

FIELD

Embodiments generally relate to computer systems, and more particularly to methods and systems for executing queries.

BACKGROUND

Complex event processing (CEP) is a technology for enabling the information contained in the events, flowing through various layers of the enterprise IT infrastructure, to be discovered, understood in terms of its impact on high level management goals and business processes, and acted upon in real time. CEP provides the ability to analyze high-volume and high-speed event streams. The event streams may include financial data feeds, any continuous stream of events of a similar type or the like.

A CEP system is typically used for performing CEP on the event streams/data. The CEP system receives several user queries from users for processing the event streams/data. CEP system shares many aspects with traditional database systems, including multi-query optimization. A typical multi query optimization approach involves obtaining a query plan for the queries by identifying similar sub query graphs in the received queries and reusing the result produced by the sub query graphs for determining the final query results. The CEP system then maps the query plan to physical or virtual nodes.

A drawback of using the multi-query optimization approach in the CEP system is that whenever one of these nodes crash the query located on the crashed node stops processing data. Further, due to the multi-query optimization, the query affected by the crashed node may be needed by multiple other queries. This leads to an avalanche-like propagation of the failure, where queries running on non-crashed nodes also cannot process data as they are dependent on the query located on the crashed node.

SUMMARY

Various embodiments of systems and methods for fault tolerance based query execution are described herein.

In one aspect, plurality of queries are received from a user. The plurality of queries including one or more operators.

In another aspect, based on the received plurality of queries, a fault tolerance degree is determined for the one or more operators.

In still another aspect, based on the determined fault tolerance degree, one or more nodes are assigned to the one or more operators.

In still another aspect, the received plurality of queries are executed by the assigned one or more nodes.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for fault tolerance based query execution are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
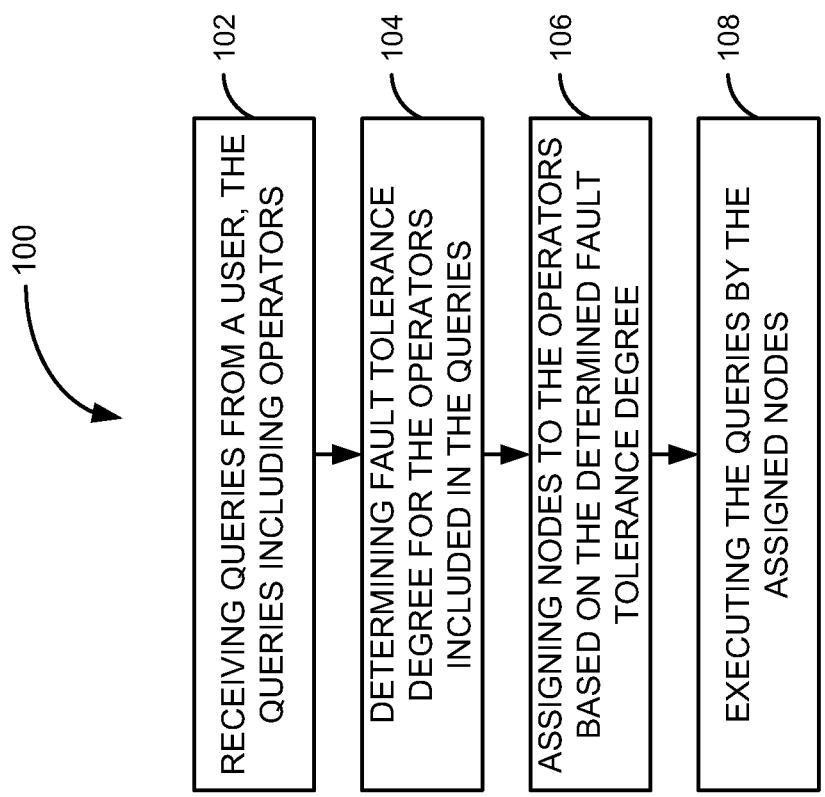
FIG. 1 is a flow diagram illustrating a method for executing queries, according to an embodiment.

FIG. 1 is a flow diagram 100 illustrating a method for executing queries, according to an embodiment. Initially, at block 102, queries are received from a user. Queries may be, for example, a code, received from the user, for processing data. Each of the queries includes several operators which in combination processes the data. For example, consider a query 1 ($f_1$ (a)⋈ $f_2$ (b)) and a query 2 ($f_1$ (a)) received from the user. The query 1 processes a data stream (a) and a data stream (b), and the query 2 processes the data stream (b). The query 1 includes three operators: a filter operator $f_1$ (a), a filter operator $f_2$ (b), and a join operator $f_1$ (a)⋈ $f_2$ (b) and the query 2 includes one operator: the filter operator $f_1$ (a).

Next at block 104, a fault tolerance degree is determined for the operators included in the queries received at block 102. The fault tolerance degree of the operator may represent the relative importance of the operator, among the operators included in the queries received at block 102, for execution of the queries received at block 102. In one embodiment, the fault tolerance degree of an operator is equal to the number of queries dependent on the operator. In the above example, two queries (queries 1 and 2) are dependent on the filter operator $f_1$(a) (as both include the filter operator $f_1$(a)) and only one query (query 2) is dependent on the filter operator $f_2(b)$ and the join operator $f_1(a) \bowtie f_2(b)$. Therefore, the fault tolerance degree for the filter operator $f_1(a)$ is determined as 2 and the fault tolerance degree for the filter operator $f_2(b)$ and the join operator $f_1(a) \bowtie f_2(b)$ is determined as 1.

Next at block 106, nodes are assigned to each of the operators in the queries received at block 102. The nodes are assigned to the operators for executing the operators. The nodes may be a physical node, for example, a computer, or a virtual node. The nodes are assigned to the operators based on the fault tolerance degree of the operators determined at block 104. The number of nodes assigned to the operator may be equal to the fault tolerance degree of the operator. In the above example, two nodes may be assigned to the filter operator $f_1(a)$ as the fault tolerance for the filter operator $f_1(a)$ is 2, and one node each may be assigned to the filter operator $f_2(b)$ and the join operator $f_1(a) \bowtie f_2(b)$. As both queries 1 and 2 are dependent on the filter operator $f_1(a)$ for their execution, both the queries 1 and 2 would be executed even if one of the nodes assigned to the filter operator $f_1(a)$ crash.

Finally at block 108, the queries received at block 102 are executed by the nodes assigned at block 106. In the above example, the filter operator $f_1(a)$ is executed simultaneously by both the nodes, in case both are working, assigned to the filter operator $f_1(a)$. The result obtained from one of the two assigned nodes is determined as the result of the filter operator $f_1(a)$. The obtained result of the filter operator $f_1(a)$ may then be re-used and joined with the result of filter operator $f_2(b)$ to obtain the result of the query 2.

Figure 2A:
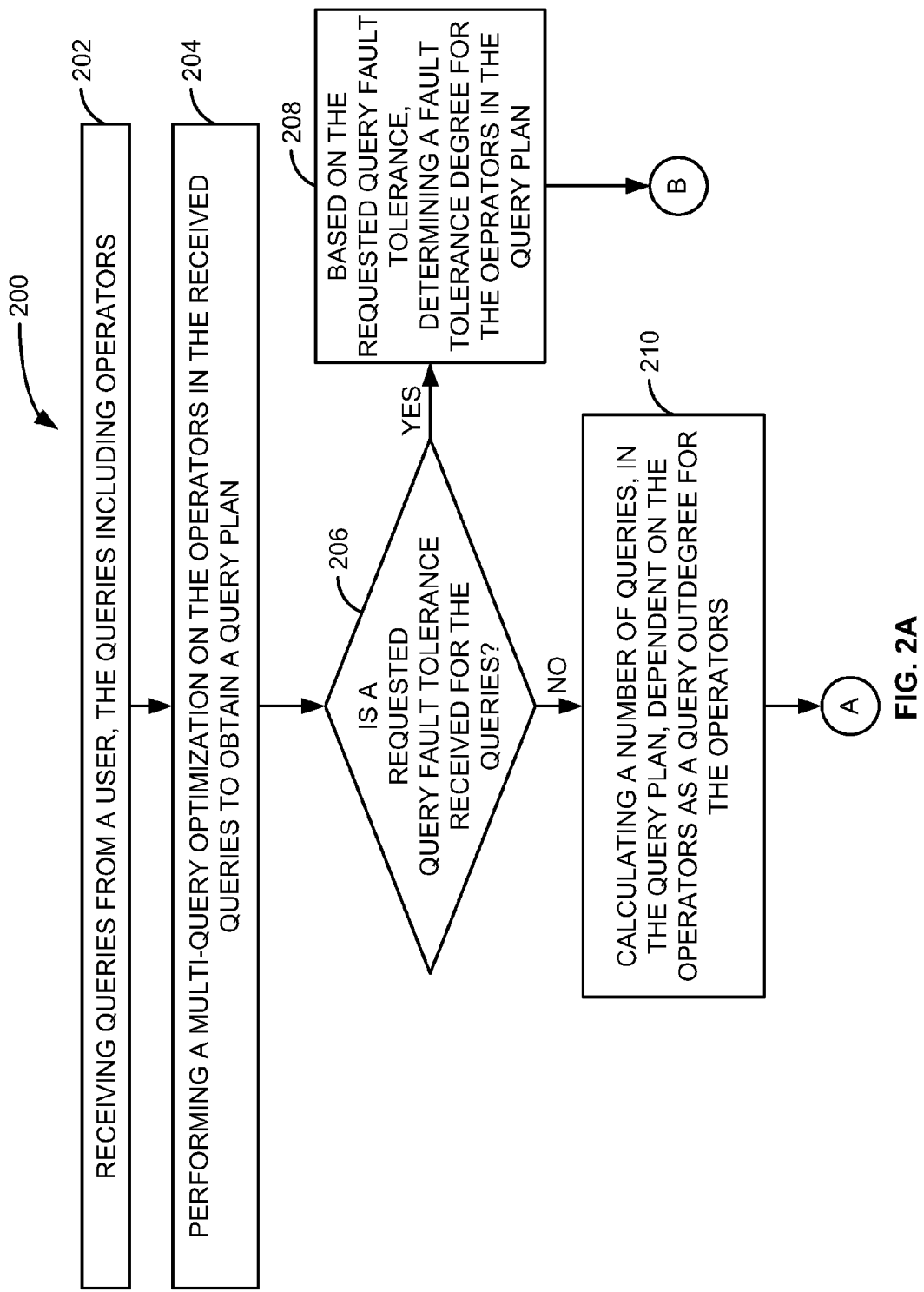
FIG. 2A-B is a detailed flow diagram illustrating a method for executing queries, according to an embodiment.
Figure 2B:
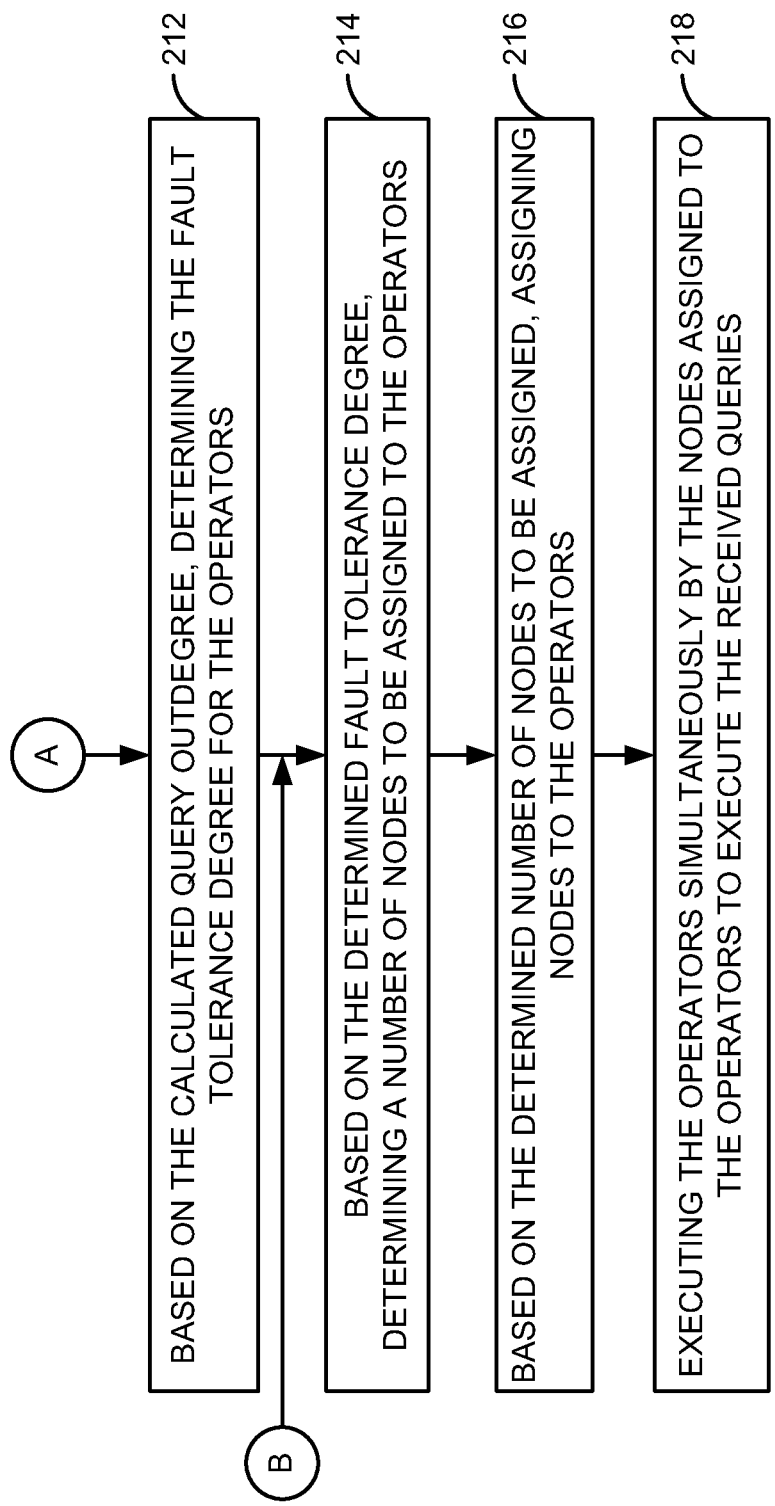

FIG. 2A-B is a detailed flow diagram 200 illustrating a method for executing queries, according to an embodiment. Initially at block 202, queries are received from a user. The queries may be received by the complex event processing (CEP) system. As discussed above, the CEP system performs CEP on event streams/data. The CEP system receives the queries for performing operations on the event streams/data. The CEP system executes queries over the event streams/data. In one embodiment, a requested query fault tolerance may also be received, from the user, for each of the queries. The requested query fault tolerance of a query may represent the number of times, the user, wants the operators in the query to be executed. The requested query fault tolerance, provided by the user, may be an integer value starting with 1 (where the value of 1 indicates that the operators in the query are to be executed only once).

As discussed above, the received queries may be a code for performing operations on the data. The received queries may include operators which in combination process the data. The operators may be, for example, a split operator, a map operator, a gather operator, a filter operator, a join operator, etc. For example, consider a "query A" ($f_1(a) \bowtie f_2(b) \bowtie f_3(c)$) and a "query B" ($f_1(a) \bowtie f_2(b)$) received from a user. The "query A" includes three filter operators: $f_1(a)$, $f_2(b)$, and $f_3(c)$ for filtering data streams a, b, and c, respectively. The "query A" also includes two join operators: $f_1(a) \bowtie f_2(b)$ and $f_1(a) \bowtie f_2(b) \bowtie f_3(c)$. The "query B" includes two filter operators $f_1(a)$ and $f_2(b)$ for filtering data streams a and b, respectively and one join operator: $f_1(a) \bowtie f_2(b)$. The user may also provide the requested query fault tolerance for "query A" as 1 and the requested query fault tolerance for "query B" as 2.

Next at block 204, a multi-query optimization is performed on the operators included in the queries received at block 202. Multi-query optimization is a technique for optimizing the execution of the queries received by the CEP system at block 202. In one embodiment, multi-query optimization optimizes the execution of the queries (received at block 202) by reducing the number of queries concurrently running in the CEP system. The multi-query optimization may reduce the number of queries by identifying identical sub-queries within a query plan, and re-using the results obtained from executing the identical sub-queries for executing the queries. A query plan is obtained for executing the operators included in the queries (received at block 202) after performing the multi-query optimization. In one embodiment, the query plan is defined as a set of all queries submitted by users to the CEP system and active at a given moment of time after the multi-query optimization. The query plan includes an ordered set of steps for executing the operators to execute the queries. The query plan may include sub-queries which are a subset of the query plan. In the above example, a multi-query optimization may be performed on the filter operators $f_1(a)$, $f_2(b)$, and $f_3(c)$ and the join operators $f_1(a) \bowtie f_2(b)$ and $f_1(a) \bowtie f_2(b) \bowtie f_3(c)$ included in the "query A" and the "query B." The filter operator ($f_1(a) \bowtie f_2(b)$) identical in both the "query A" ($f_1(a) \bowtie f_2(b)$) and the "query B" ($f_1(a) \bowtie f_2(b) \bowtie f_3(c)$) is identified as the identical sub-query in the query plan. According to the query plan, initially, the filter operator $f_1(a)$, and the filter operator $f_2(b)$ are to be executed. Next, a join operation is to be performed on the results obtained from the filter operator $f_1(a)$ and the filter operator $f_2(b)$ to execute the join operator $f_1(a) \bowtie f_2(b)$ (identical sub-query). The result of the identical sub query $f_1(a) \bowtie f_2(b)$ is the query result for "query B". To optimize the multi-query, the result of the identical sub query $f_1(a) \bowtie f_2(b)$ is then re-used and joined with the result of the filter operator $f_3(c)$ to execute the filter operator ($f_1(a) \bowtie f_2(b) \bowtie f_3(c)$). The result of execution of the filter operator ($f_1(a) \bowtie f_2(b) \bowtie f_3(c)$) is the result of the "query B".

Next, at block 206, a determination is made whether the requested query fault tolerance is received, from the user, for the queries received at block 202. In case, the requested query fault tolerance is received for the queries (e.g., condition in block 206 is true) a fault tolerance degree is determined for each of the operators included in the query plan, based on the requested query fault tolerance degree of the queries (block 208). In one embodiment, the fault tolerance degree of an operator is determined, based on the requested query fault tolerance, by traversing the query plan to identify if any of the descendant operators of the operator, in the query plan, is an end operator for a query. The descendant operators are operators encountered by the operator when traversing the query plan. The descendent operator is an end operator when the result of execution of the descendent operator is a query result of one of the queries (received at block 202). The requested fault tolerance of the queries corresponding to the identified descendant operators (identified as end operators) are compared with each other to determine the requested query fault tolerance having the highest value. Finally, the requested query fault tolerance having the highest value is determined as the fault tolerance degree of the operator. In the above example, the descendant operators for the filter operator $f_1(a)$ is the join operators $f_1(a) \bowtie f_2(b)$ and $f_1(a) \bowtie f_2(b) \bowtie f_3(c)$ which are encountered when traversing the query plan. The join operators $f_1(a) \bowtie f_2(b)$ and $f_1(a) \bowtie f_2(b) \bowtie f_3(c)$ are end operators for the "query B" and the "query A", respectively, as executing the join operator $f_1(a) \bowtie f_2(b)$ and the join operator $f_1(a) \bowtie f_2(b) \bowtie f_3(c)$ executes the "query B" and the "query A", respectively. As both the join operators $f_1(a) \bowtie f_2(b)$ and $f_1(a) \bowtie f_2(b) \bowtie f_3(c)$ are end operators for the "query B" and the "query A", respectively, the requested query fault tolerances 2 and 1 corresponding to the "query B" and the "query A", respectively, are compared with each other. Based on the comparison it is determined that the requested query fault tolerance (2) of "query B" has the highest value. Finally, the highest requested query fault tolerance (2) of the "query B" is determined as the fault tolerance degree of the filter operator $f_1(a)$. Similarly, the fault tolerance degree of operators $f_2(b)$, $f_1(a) \bowtie f_2(b)$, $f_3(c)$ and $f_1(a) \bowtie f_2(b) \bowtie f_3(c)$ are determined as 2, 2, 1 and 1, respectively.

In case the requested query fault tolerance of the queries is not received (condition in block 206 is false) a query outdegree is calculated for each of the operators included in the query plan (block 210). The query outdegree of the operator is a representation of the number of queries dependent on the operator. In one embodiment, the query outdegree of the operator is the number of queries including the operator. The query outdegree of the operator may be calculated by traversing the query plan and determining if any of the descendant operators of the operator is of type "query". In one embodiment, the descendant operator is of type "query" when the output of execution of the operator is a query result. For each descendant operator of the operator that is of type "query" the count of the query outdegree (which is initialized to 0) of the operator is incremented by 1. The count obtained after traversing the query plan is determined as the query outdegree of the operator. The calculation of the query outdegree is done recursively and assumes that the query plan forms a directed acyclic graph (DAG). In one embodiment, a DAG is a directed graph with no directed cycles. For example, a DAG may be formed by a collection of vertices and directed edges, each edge connecting one vertex to another, such that there is no way to start at some vertex v and follow a sequence of edges that eventually loops back to v again. Further, it assumes that the terminating vertices in the query plan DAG are of type query.

In the above example, for the filter operator $f_1(a)$ the join operators $f_1(a) \bowtie f_2(b)$ and $f_1(a) \bowtie f_2(b) \bowtie f_3(c)$ are descendent operators, which are encountered by the filter operator $f_1(a)$ when traversing the query plan. When the query plan is traversed, it is determined that the join operator ($f_1(a) \bowtie f_2(b)$) is of type "query" (as the output of execution of the join operator ($f_1(a) \bowtie f_2(b)$) is the query result of query B). As the join operator ($f_1(a) \bowtie f_2(b)$) is of type "query" the count of the query outdegree for the filter operator $f_1(a)$, which is initially 0, is incremented by 1. Next, the join operator $f_1(a) \bowtie f_2(b) \bowtie f_3(c)$ is encountered, which again is of type "query" (as the output of executing the join operator $f_1(a) \bowtie f_2(b) \bowtie f_3(c)$ is the query result of query A). Therefore, the query outdegree for the filter operator $f_1(a)$ is again incremented by 1 to obtain a value of 2. As there are no more descendent operators of the filter operator $f_1(a)$, the calculated query outdegree (2), obtained after traversing the query plan, is determined as the query outdegree of the filter operator $f_1(a)$. Similarly, the query outdegree for the operators $f_2(b)$, $f_1(a) \bowtie f_2(b)$, $f_3(c)$ and $f_1(a) \bowtie f_2(b) \bowtie f_3(c)$ is determined as 2, 2, 1 and 1, respectively. In one embodiment, the calculated query outdegree is normalized for the total number of queries in the CEP system to obtain a normalized query outdegree for the operator. The normalized query outdegree is calculated by the formula:

Normalized query outdegree of the operator=query outdegree of the operator/number of queries in the system.

A normalized query outdegree value of 1 indicates that the output of the operator is being used by all the queries in the CEP system. In the above example, the normalized query outdegree value for the filter operator $f_1(a)$ is 1 (query outdegree (2)/total number of queries (2)). Similarly, the normalized query outdegree for the operators $f_2(b)$, $f_1(a) \bowtie f_2(b)$, $f_3(c)$ and $f_1(a) \bowtie f_2(b) \bowtie f_3(c)$ are determined as 1, 1, 0.5, and 0.5, respectively.

Next at block 212, a fault tolerance degree for the operators in the query plan is determined, based on the query outdegree of the operators calculated at block 210. As discussed above, the fault tolerance degree of the operator may represent the importance of the operator for executing the queries in the query plan. In one embodiment, the calculated query outdegree of the operator is determined as the fault tolerance degree (one-to-one assignment) of the operator. In the above example, the query outdegree for the operators $f_1(a)$, $f_2(b)$, $f_1(a) \bowtie f_2(b)$, $f_3(c)$ and $f_1(a) \bowtie f_2(b) \bowtie f_3(c)$ is determined as 2, 2, 2, 1 and 1, respectively (same as the query outdegree of these operators, based on the one-to-one assignment).

Next, at block 214, number of nodes to be assigned to each of the operators in the query plan are determined based on the fault tolerance degree of the operator (which is determined either based on the requested query fault tolerance (block 208) or based on the query outdegree (block 212)). The query fault tolerance degree of the operator may be determined as the number of nodes to be assigned to the operator. In one embodiment, the number of nodes to be assigned to the operator is determined based on the availability of nodes for executing the queries. For example a determination may be made to assign a higher number of nodes to an operator having a higher fault tolerance degree and a lower of nodes to an operator having a lower fault tolerance value. In the above example, based on the determined fault tolerance degree of the operators, the number of nodes to be assigned to the operators $f_1(a)$, $f_2(b)$, $f_1(a) \bowtie f_2(b)$, $f_3(c)$ and $f_1(a) \bowtie f_2(b) \bowtie f_3(c)$ are determined as 2, 2, 2, 1 and 1, respectively.

Next at block 216, nodes are assigned to the operators in the query plan based on the determined number of nodes to be assigned to the operators (determined at block 214). For example, a pool of physical nodes or virtual nodes is available to the CEP system. Based on the determined number of nodes (at block) to be assigned to the operator one or more nodes from the pool of nodes are assigned to the operator. Each operator in the query plan may be assigned at least one node from the pool of nodes. The nodes are assigned to the operator for executing the operator. In the above example, a node 1 and a node 2 are assigned to the filter operator $f_1(a)$ (based on the determined number of nodes 2 to be assigned to the filter operator $f_1(a)$), a node 3 and a node 4 are assigned to the filter operator $f_2(b)$ (based on the determined number of nodes 2 to be assigned to the filter operator $f_2(b)$), a node 4 and a node 5 are assigned to the join operator $f_1(a) \bowtie f_2(b)$ (based on the determined number of nodes 2 to be assigned to the join operator $f_1(a) \bowtie f_2(b)$), a node 6 is assigned to the filter operator $f_3(c)$ (based on the determined number of nodes 1 to be assigned to the filter operator $f_3(c)$), and a node 7 is assigned to the join operator $f_1(a) \bowtie f_2(b) \bowtie f_3(c)$ (based on the determined number of nodes 1 to be assigned to the join operator $f_1(a) \bowtie f_2(b) \bowtie f_3(c)$).

Finally, the queries received at block 202 are executed by executing the operators in the query plan (block 218). The operators in the query plan are executed by the nodes assigned to the operators in block 216. In one embodiment, if more than one nodes is assigned to an operator then the operator is executed simultaneously by each of the assigned nodes. The result obtained from one of the nodes (simultaneously executing the operator) may then be used for executing the operators dependent on this operator. Simultaneously executing the operator by more than one nodes ensures that the queries (received at block 202) are executed even if one of these nodes crash. The operators may be executed in an order defined by the query plan. In the above example, the nodes 1-2 and the nodes 3-4 simultaneously execute the filter operator $f_1(a)$ and the filter operator $f_2(b)$, respectively. Output originating from one of the nodes 1 and 2, and one of the nodes 3 and 4 is then provided to the nodes 4 and 5. The nodes 4 and 5 then simultaneously execute the join operator $f_1 (a) \bowtie f_2 (b)$. The output obtained from one of the nodes 4 and 5 is the result of execution of the query B. Next, the output obtained from one of the nodes 4 and 5, and the output obtained from node 6 (which execute the filter operator $f_3(c)$) is provided to the node 6 which executes the join operator $f_1 (a) \bowtie f_2 (b) \bowtie f_3(c)$. The output obtained from the node 6 is the result of execution of the query A.

Figure 3:
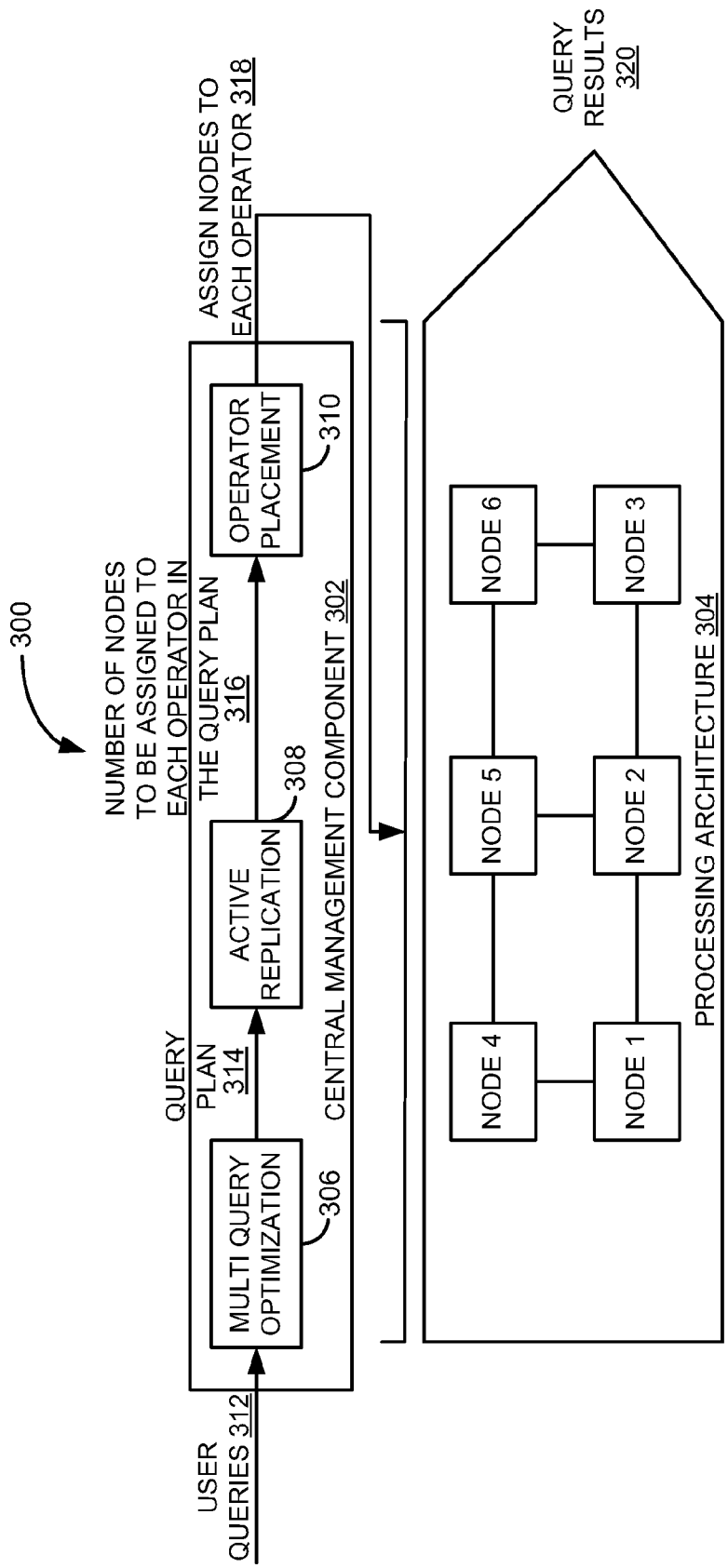
FIG. 3 is a block diagram illustrating a system for executing queries, according to an embodiment.

FIG. 3 is a block diagram illustrating a system 300 for executing queries, according to an embodiment. The system 300 includes a central management component 302 and a processing architecture 304 which includes six nodes (Nodes 1-6) for executing queries. The central management component 302 includes a multi query optimization module 306, an active replication module 308, and an operator placement module 310. As shown, the multi query optimization module 306 receives user queries 312. The multi query optimization module 306 performs query optimization on the operators in the received user queries 312 to obtain a query plan 314. Next, the query plan 314 is forwarded to the active replication module 308. The active replication module 308 calculates the fault tolerance degree of the operators included in the query plan 314. Based on the calculated fault tolerance degree, the active replication module 308 determines a number of nodes 316 to be assigned to each of the operators in the query plan 314. Based on the query plan 314, the determined number of nodes 316, and the number of nodes (which is 6 in this case (Nodes 1-6)) in the processing architecture 304, the operator placement module 310 assigns nodes (from Nodes 1-6) 318 to each operator in the query plan 314. Finally, the assigned nodes (from the Nodes 1-6) in the processing architecture 304 execute the query plan 314 to obtain the query results 320 of the user queries 312.

Figure 4:
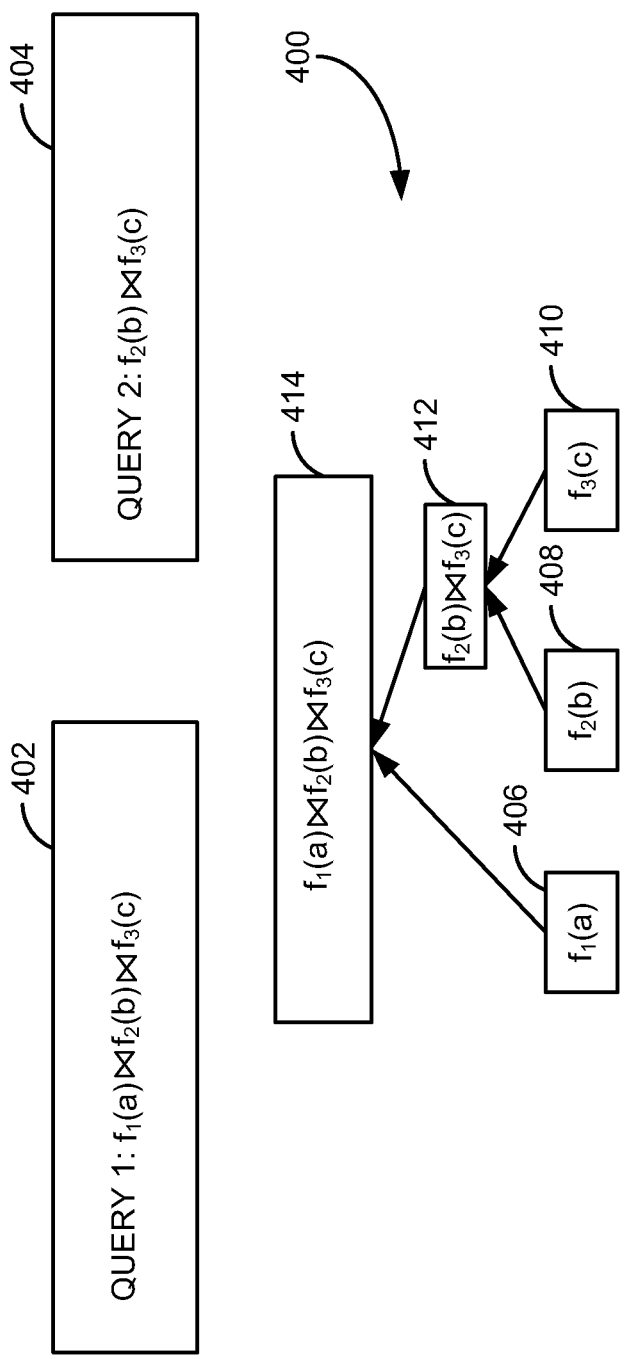
FIG. 4 is an exemplary block diagram illustrating creation of a query plan for executing a query 1 and a query 2, according to an embodiment.

FIG. 4 is an exemplary block diagram illustrating creation of a query plan 400 for executing a query 1 402 and a query 2 404, according to an embodiment. A multi-query optimization is performed on operators included in the query 1 ($f_1 (a) \bowtie f_2 (b) \bowtie f_3(c)$) 402 and the query 2 ($f_2 (b) \bowtie f_3(c)$) 404 to obtain the query plan 400. The query 1 402 includes filter operators $f_1(a)$ 406, $f_2 (b)$ 408, and $f_3(c)$ 410, and join operators $f_2 (b) \bowtie f_3(c)$ 412 and $f_1 (a) \bowtie f_2 (b) \bowtie f_3(c)$ 414. The query 2 includes the filter operators $f_2 (b)$ 408, and $f_3(c)$ 410, and the join operator $f_2 (b) \bowtie f_3(c)$ 412. As shown, the query plan 400 defines the order for executing the operators included in the query 1 402 and the query 2 404. Initially, the filter operators $f_2 (b)$ 408 and $f_3(c)$ 410 are to be executed. Next, the result of execution of the filter operators $f_2 (b)$ 408 and $f_3(c)$ 410 are to be joined to execute the join operator $f_2 (b) \bowtie f_3(c)$ 412. Finally, the result of execution of the join operator $f_2 (b) \bowtie f_3(c)$ 412 is to be reused and joined with the result of the filter operator $f_1(a)$ 406 to execute the join operator $f_1 (a) \bowtie f_2 (b) \bowtie f_3(c)$ 414.

Figure 5:
FIG. 5 is an exemplary block diagram illustrating an assignment table for assigning nodes to operators in the query plan of FIG. 4, according to an embodiment.

FIG. 5 is an exemplary block diagram illustrating an assignment table 500 for assigning nodes to operators in the query plan 400 of FIG. 4, according to an embodiment. As discussed above, the nodes are assigned to the operators based on the fault tolerance degree of the operators. The assignment table 500 includes an operator column 502 which includes the list of operators 406-414 in the query plan 400 of FIG. 4, a fault tolerance degree column 504 which includes the fault tolerance degree of the operators 406-414, and a nodes assigned column 506 which includes a list of the nodes assigned to the operators 406-414 in the query plan 400 (FIG. 4). As discussed above, the fault tolerance degree of the operator is calculated by traversing the query plan and counting the number of descendent operators of the query which are of type "query". When the query plan 400 is traversed for the filter operator $f_1(a)$ 406, it is determined that the filter operator $f_1(a)$ 406 includes only one descendent operator (join operator ($f_1 (a) \bowtie f_2 (b) \bowtie f_3(c)$) which is of type "query" (as the result of execution of the join operator ($f_1 (a) \bowtie f_2 (b) \bowtie f_3(c)$ 414) is the query result of query 1 402 (FIG. 4)). Therefore, the fault tolerance degree 504 for the filter operator $f_1(a)$ 406 is determined as 1. Similarly, the fault tolerance degree for the operators $f_2 (b)$ 408, $f_3(c)$ 410, $f_2 (b) \bowtie f_3(c)$ 412, and $f_1 (a) \bowtie f_2 (b) \bowtie f_3(c)$ 414 is determined as 2, 2, 1, and 1, respectively. Further, based on the determined fault tolerance degree 504 of the operators 406-414, nodes 506 are assigned to each of the operators 406-414. As shown, based on the fault tolerance degree (1) of the filter operator $f_1(a)$ 406 one node (Node 1 508) is assigned to the filter operator $f_1(a)$ 406. Similarly, based on the fault tolerance degree 2, 2, 1, and 1 of the operators $f_2 (b)$ 408, $f_3(c)$ 410, $f_2 (b) \bowtie f_3(c)$ 412, and $f_1 (a) \bowtie f_2 (b) \bowtie f_3(c)$ 414, respectively, two nodes (Node 2a 510 and Node 2b 512), two nodes (Node 3a 514 and Node 3b 516), two nodes (Node 4a 518 and Node 4b 520), and one node (Node 5 522) are assigned to the operators $f_2 (b)$ 408, $f_3(c)$ 410, $f_2 (b) \bowtie f_3(c)$ 412, and $f_1 (a) \bowtie f_2 (b) \bowtie f_3(c)$ 414, respectively.

Figure 6:
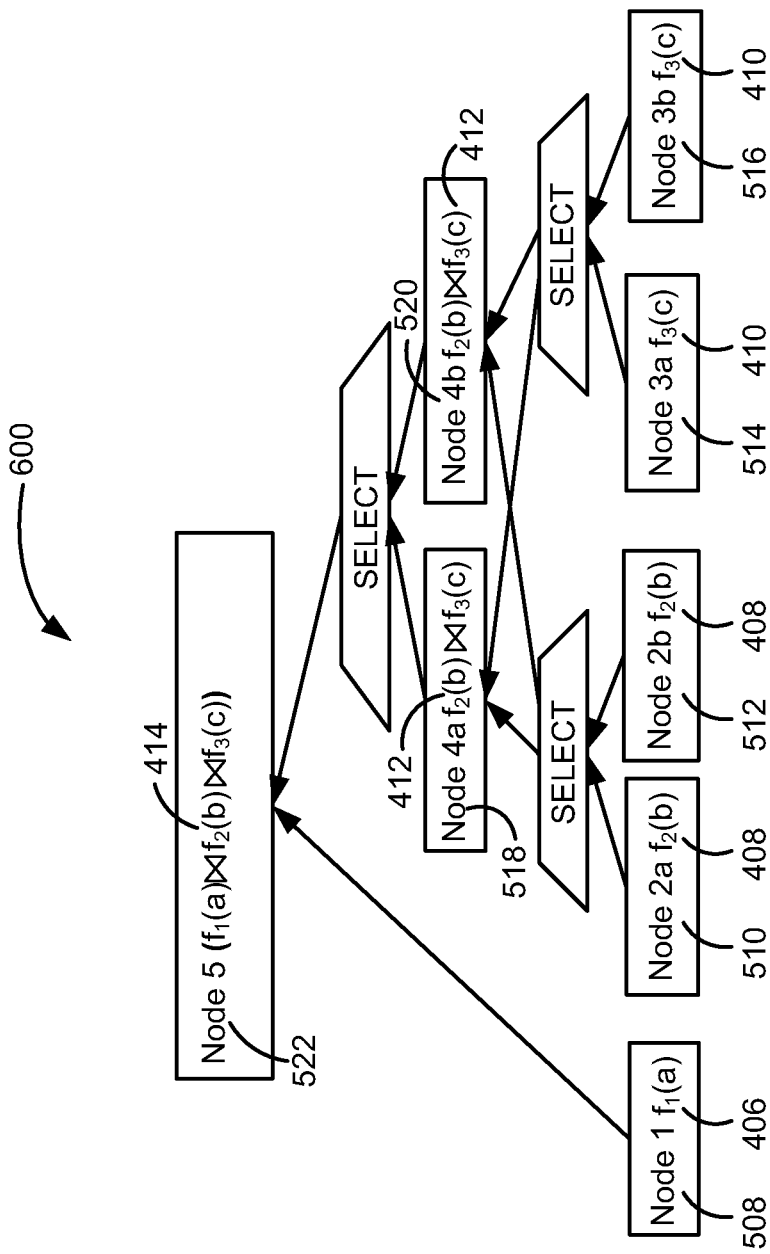
FIG. 6 is an exemplary block diagram illustrating execution of the query 1 and the query 2 of FIG. 4 by the nodes assigned in FIG. 5, according to an embodiment.

FIG. 6 is an exemplary block diagram 600 illustrating execution of the query 1 402 and the query 2 404 of FIG. 4 by the nodes assigned 506 in FIG. 5, according to an embodiment. The query 1 402 and the query 2 404 are executed by executing the operators (406-414) in the query plan 400 of FIG. 4. The operators (406-414) are executed in the sequence defined by the query plan 400 of FIG. 4. The operators (406-414) in the query plan 400 are executed by the nodes assigned 506 in the assignment table 500 of FIG. 5. Initially, the nodes 2a-2b (510 and 512) and the nodes 3a-3b (514 and 516) simultaneously execute the filter operator $f_2(b)$ 408 and the filter operator $f_3(c)$ 410, respectively. A result of execution of the filter operator $f_2(b)$ 408 obtained from either one of the nodes 2a-2b (510 and 512) is selected (select) and a result of execution of the filter operator $f_3(c)$ 410 obtained from either one of the nodes 3a-3b (514 and 516) is selected (select). The result of execution of the filter operator $f_2(b)$ 408 and the filter operator $f_3(c)$ 410, after the selection, is forwarded to the nodes 4a-4b (518 and 520). The nodes 4a-4b (518 and 520) then simultaneously join (by executing the join operator ($f_2 (b) \bowtie f_3(c)$ 412) the result of execution of the filter operator $f_1(a)$ 406 and the filter operator $f_2(b)$ 408 to obtain the result of the query 2 404 of FIG. 4. The result of execution of the filter operator $f_2 (b) \bowtie f_3(c)$ 412 obtained from one of the nodes 4a-4b (518 and 520) is selected (select) and then forwarded to the node 5 524. Finally, the result of execution of the join operator $f_2 (b) \bowtie f_3(c)$ 412 and the result of execution of the filter operator $f_1(a)$ 406 from node 1 508 is joined (by executing the join operator $f_1 (a) \bowtie f_2 (b) \bowtie f_3(c)$ 414) by the node 5 522 to obtain the result of execution of the query 1 402.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls or web services being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
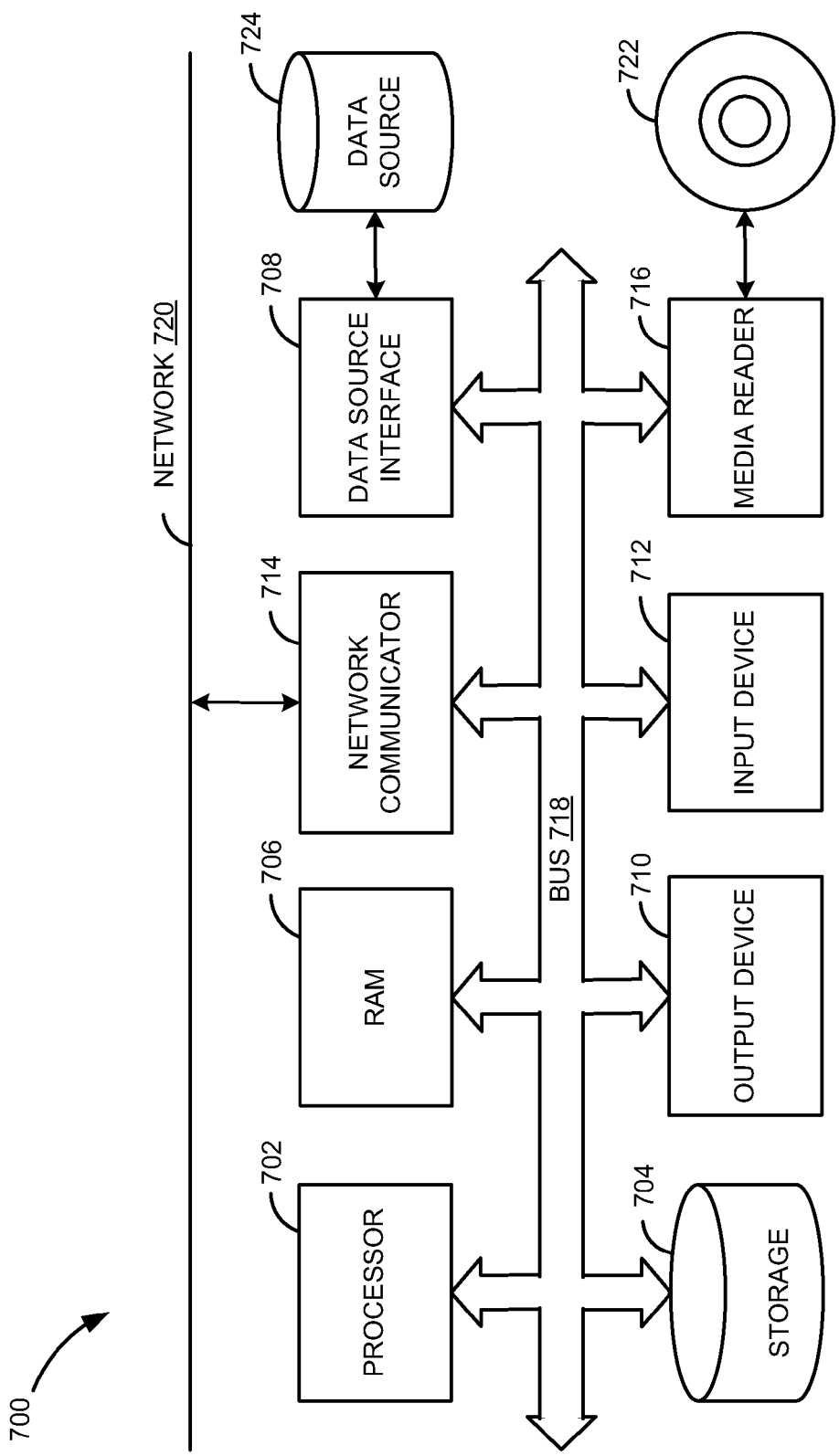
FIG. 7 is a block diagram illustrating a computing environment in which the techniques described for fault tolerance based query execution can be implemented, according to an embodiment.

FIG. 7 is a block diagram of an exemplary computer system 700. The computer system 700 includes a processor 702 that executes software instructions or code stored on a computer readable storage medium 722 to perform the above-illustrated methods of the invention. The computer system 700 includes a media reader 716 to read the instructions from the computer readable storage medium 722 and store the instructions in storage 704 or in random access memory (RAM) 706. The storage 704 provides a large space for keeping static data where at least some instructions could be stored for later execution. The stored instructions may be further compiled to generate other representations of the instructions and dynamically stored in the RAM 706. The processor 702 reads instructions from the RAM 706 and performs actions as instructed. According to one embodiment of the invention, the computer system 700 further includes an output device 710 (e.g., a display) to provide at least some of the results of the execution as output including, but not limited to, visual information to users and an input device 712 to provide a user or another device with means for entering data and/or otherwise interact with the computer system 700. Each of these output devices 710 and input devices 712 could be joined by one or more additional peripherals to further expand the capabilities of the computer system 700. A network communicator 714 may be provided to connect the computer system 700 to a network 720 and in turn to other devices connected to the network 720 including other clients, servers, data stores, and interfaces, for instance. The modules of the computer system 700 are interconnected via a bus 718. Computer system 700 includes a data source interface 708 to access data source 724. The data source 724 can be accessed via one or more abstraction layers implemented in hardware or software. For example, the data source 724 may be accessed by network 720. In some embodiments the data source 724 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method for executing a plurality of queries, the method comprising:
receiving the plurality of queries from a user, the plurality of queries including a plurality of operators;
based on the received plurality of queries, determining, by a processor of the computer, a fault tolerance degree for the plurality of operators, wherein determining the fault tolerance degree includes:

calculating, by the processor of the computer, a query outdegree for an operator from the plurality of operators by counting a number of the plurality of queries that include the operator from the plurality of operators, wherein the counted number of the plurality of queries is the query outdegree corresponding to the operator from the plurality of operators; and determining, by the processor of the computer, the fault tolerance degree for the plurality of operators based on the calculated query outdegree;

based on the determined fault tolerance degree, assigning, by the processor of the computer, a plurality of nodes to the plurality of operators; and executing the received plurality of queries by the assigned plurality of nodes.

2. The computer implemented method according to claim 1, wherein executing the received plurality of queries includes:

simultaneously executing the plurality of operators by the assigned plurality of nodes.

3. The computer implemented method according to claim 1, wherein assigning the one or more nodes includes:

determining, by the processor of the computer, a number of the plurality of nodes to be assigned to the plurality of operators based on the determined fault tolerance degree; and based on the determined number of the plurality of nodes, assigning, by the processor of the computer, the plurality of nodes to the plurality of operators.

4. The computer implemented method according to claim 1, further comprising:

performing, by the processor of the computer, a multi-query optimization on the plurality of operators included in the received plurality of queries to obtain a query plan; and determining, by the processor of the computer, the fault tolerance degree of the plurality of operators included in the query plan.

5. The computer implemented method according to claim 1, further comprising:

receiving, from the user, a requested query fault tolerance for the plurality of queries.

6. The computer implemented method according to claim 5, wherein determining the fault tolerance degree includes:

determining, by the processor of the computer, the fault tolerance degree of the plurality of operators based on the received requested query fault tolerance.

7. A non-transitory computer readable storage medium to tangibly store instructions, which when executed by a computer, cause the computer to:

receive a plurality of queries from a user, the plurality of queries including a plurality of operators;

based on the received plurality of queries, determine a fault tolerance degree for the plurality of operators, wherein determining the fault tolerance degree includes:

calculate a query outdegree for an operator from the plurality of operators by counting a number of the plurality of queries that include the operator from the plurality of operators, wherein the counted number of the plurality of queries is the query outdegree corresponding to the operator from the plurality of operators; and determine the fault tolerance degree for the plurality of operators based on the calculated query outdegree;

based on the determined fault tolerance degree, assign a plurality of nodes to the plurality of operators; and execute the received plurality of queries by the assigned plurality of nodes.

8. The non-transitory computer readable storage medium according to claim 7, further comprising instructions which when executed by the computer further causes the computer to:

simultaneously execute the plurality of operators by the assigned plurality of nodes.

9. The non-transitory computer readable storage medium according to claim 7, further comprising instructions which when executed by the computer further causes the computer to:

determine a number of the plurality of nodes to be assigned to the plurality of operators based on the determined fault tolerance degree; and based on the determined number of the plurality of nodes, assign the plurality of nodes to the plurality of operators.

10. The non-transitory computer readable storage medium according to claim 7, further comprising instructions which when executed by the computer further causes the computer to:

perform a multi-query optimization on the plurality of operators included in the received plurality of queries to obtain a query plan; and determine the fault tolerance degree of the plurality of operators included in the query plan.

11. The non-transitory computer readable storage medium according to claim 7, further comprising instructions which when executed by the computer further causes the computer to:

receive, from the user, a requested query fault tolerance for the plurality of queries.

12. The non-transitory computer readable storage medium according to claim 11, further comprising instructions which when executed by the computer further causes the computer to:

determine the fault tolerance degree of the plurality of operators based on the received requested query fault tolerance.

13. A computer system for executing a plurality of queries, the computer system comprising:

a memory to store a program code; and a processor communicatively coupled to the memory, the processor configured to execute the program code to:

receive the plurality of queries from a user, the plurality of queries including a plurality of operators;

based on the received plurality of queries, determine a fault tolerance degree for the plurality of operators, wherein determining the fault tolerance degree includes:

calculate a query outdegree for an operator from the plurality of operators by counting a number of the plurality of queries that include the operator from the plurality of operators, wherein the counted number of the plurality of queries is the query outdegree corresponding to the operator from the plurality of operators; and determine the fault tolerance degree for the plurality of operators based on the calculated query outdegree;

based on the determined fault tolerance degree, assign a plurality of nodes to the one or more operators; and execute the received plurality of queries by the assigned plurality of nodes.

14. The system of claim 13, wherein the processor further executes the program code to:

simultaneously execute the plurality of operators by the assigned plurality of nodes.

15. The system of claim 13, wherein the processor further executes the program code to:
   determine a number of the plurality of nodes to be assigned to the plurality of operators based on the determined fault tolerance degree; and
   based on the determined number of nodes, assign the plurality of nodes to the plurality of operators.

16. The system of claim 13, wherein the processor further executes the program code to:
   perform a multi-query optimization on the plurality of operators included in the received plurality of queries to obtain a query plan; and
   determine the fault tolerance degree of the plurality of operators included in the query plan.

17. The system of claim 13, wherein the processor further executes the program code to:
   receive, from the user, a requested query fault tolerance for the plurality of queries.

* * * * *